(12) United States Patent
Davis et al.

(10) Patent No.: US 12,014,243 B2
(45) Date of Patent: Jun. 18, 2024

(54) MODULAR AND HYGIENIC RFID TRAINING SLEEVE

(71) Applicant: SIVAD AiCOMSCi, PBC, Chicago, IL (US)

(72) Inventors: Bruce Roland Davis, Chicago, IL (US); Cameron Davis, Chicago, IL (US)

(73) Assignee: SIVAD AiCOMSCi, PBC, Chicago, IL (US)

( * ) Notice: Subject to any disclaimer, the term of this patent is extended or adjusted under 35 U.S.C. 154(b) by 0 days.

(21) Appl. No.: 17/986,738

(22) Filed: Nov. 14, 2022

(65) Prior Publication Data

US 2023/0073313 A1  Mar. 9, 2023

Related U.S. Application Data

(63) Continuation-in-part of application No. PCT/US2020/046873, filed on Aug. 19, 2020.

(60) Provisional application No. 63/026,144, filed on May 18, 2020.

(51) Int. Cl.
*G06K 7/10* (2006.01)
*G06K 19/07* (2006.01)

(52) U.S. Cl.
CPC ..... *G06K 7/10366* (2013.01); *G06K 7/10396* (2013.01); *G06K 19/0723* (2013.01)

(58) Field of Classification Search
None
See application file for complete search history.

(56) References Cited

U.S. PATENT DOCUMENTS

| | | | |
|---|---|---|---|
| 8,555,032 | B2 | 10/2013 | Snyder |
| 9,040,837 | B2 | 5/2015 | Takahashi et al. |
| 9,813,845 | B2 | 11/2017 | Kim et al. |
| 10,045,742 | B2 | 8/2018 | Kovarik et al. |
| 10,210,445 | B2 | 2/2019 | Nikunen et al. |

(Continued)

FOREIGN PATENT DOCUMENTS

WO  WO-2022086346 A1 *  4/2022

OTHER PUBLICATIONS

International Search Report & Written Opinion for PCT/US2020/046873 dated Jan. 13, 2021, 16 pages.

(Continued)

*Primary Examiner* — Suezu Ellis
(74) *Attorney, Agent, or Firm* — Foley & Lardner LLP

(57) ABSTRACT

A shareable, wearable training system including a first cuff configured to be worn on an upper arm and/or torso of a user, the first cuff including a first housing defining a first slot and a radio-frequency identification (RFID) transponder sized to fit within the first slot, a second cuff configured to be worn on a lower arm of the user, the second cuff comprising a second housing defining a second slot, and an interchangeable computer system sized to fit within the second slot. The computer system includes a RFID reader and instructions causing the computer system to determine and record whether the RFID transponder is within a threshold distance of the RFID reader and provides the user with a notification when the RFID transponder is within the threshold distance, thereby notifying the user when a distance between a hand of the user and a face of the user is less than the threshold distance.

20 Claims, 18 Drawing Sheets

(56) References Cited

U.S. PATENT DOCUMENTS

| | | | |
|---|---|---|---|
| 10,627,683 B2 | 4/2020 | Gao et al. | |
| 2004/0027247 A1* | 2/2004 | Pittman | G08B 23/00 |
| | | | 340/573.7 |
| 2009/0125083 A1* | 5/2009 | Maples | A61F 5/013 |
| | | | 600/595 |
| 2010/0271187 A1 | 10/2010 | Uysal et al. | |
| 2012/0044069 A1* | 2/2012 | Saxena | A61B 5/747 |
| | | | 340/539.12 |
| 2014/0066817 A1 | 3/2014 | Kovarik et al. | |
| 2017/0000206 A1 | 1/2017 | Chong | |
| 2017/0249824 A1 | 8/2017 | Kaplan et al. | |
| 2018/0027908 A1 | 2/2018 | Greenly | |
| 2018/0225039 A1 | 8/2018 | Warren | |
| 2019/0280396 A1 | 9/2019 | Lazzi et al. | |
| 2021/0233378 A1* | 7/2021 | Murati | G08B 21/245 |
| 2022/0375326 A1* | 11/2022 | Basham | G08B 6/00 |
| 2023/0410997 A1* | 12/2023 | Ng | G06F 3/011 |

OTHER PUBLICATIONS

Kwok, et al., "Face touching: A frequent habit that has implications for hand hygiene," American Journal of Infection Control 43(2), pp. 112-114 (2015).

* cited by examiner

MODULAR AND HYGIENIC RFID TRAINING SLEEVE

CROSS-REFERENCE TO RELATED APPLICATIONS

This application is a continuation-in-part of International Patent App. No. PCT/US2020/046873, filed Aug. 19, 2020, which claims priority to U.S. Provisional Patent App. No. 63/026,144, filed May 18, 2020, the contents of which are incorporated herein in their entireties by reference.

BACKGROUND

The present disclosure relates generally to how infectious diseases can be transmitted by objects which have been contaminated with a disease-causing pathogen. Such transmission can take many forms, but a common form is hand-to-face transmission. Hands touch numerous potentially contaminated surfaces throughout the day and the pathogens on those surfaces can easily by transferred. Contaminated hands can transmit the pathogens to the face where the pathogen can infect and cause disease. Or an infected person may unconsciously transmit disease causing pathogens to surfaces that others may touch.

Personal protective equipment (PPE) can be used to provide a physical barrier between a user and contaminated surfaces, but encouraging healthy habits further protects a user in addition to PPE, or may provide some protection in situations where PPE is not available. In some fields, such as nursing, where touching contaminated objects is especially common and expected, reducing the prevalence of hand-to-face touching would reduce the risk of infection. Thus, there is a desire for a training system that may be used to prevent the prevalence of hand-to-face transmission of infectious diseases, also known as fomite transmissions.

Radio-frequency identification (RFID) is a method of identifying and tracking objects tagged with a radio transponder. RFID systems consist of a RFID tracker and a RFID tag. Passive tag RFID systems do not require an onboard power source on the RFID tag, receiving energy instead from the RFID reader's interrogating radio waves. Because of this, low-frequency passive tag RFID systems have a range of about 1 inch to 6 inches. This relatively short range allows for RFID to be useful in detecting specific proximity, making it ideal for use in detecting hand-to-face touching.

SUMMARY

In one embodiment, a training system includes a first cuff configured to be worn on an upper arm of a user, the first cuff including a first housing defining a first slot and a radio-frequency identification (RFID) transponder sized to fit within the first slot, a second cuff configured to be worn on a lower arm of the user, the second cuff comprising a second housing defining a second slot, and an interchangeable computer system sized to fit within the second slot, the computer system including a RFID reader, a processor, and instructions stored in a non-transitory machine-readable media that, when executed by the processor, cause the computer system to determine whether the RFID transponder is within a first threshold distance of the RFID reader, record the occurrence, and provide a notification to the user when the RFID transponder is within the first threshold distance, thereby recording the occurrence and notifying the user when a distance between a hand of the user and a face of the user is less than a second threshold distance.

In another embodiment, a method for training a user to avoid transmission includes providing a first cuff to be worn on an upper arm of a user, the first cuff comprising a radio-frequency identification (RFID) tag, providing a second cuff to be worn on a lower arm of the user, the second cuff comprising a RFID reader, detecting when the RFID transponder and the RFID reader are within a first threshold distance of each other, recording the occurrence, and notifying the user when a distance between a hand of the user and a face of the user is less than a second threshold distance, wherein the second threshold distance is related to the first threshold distance.

In another embodiment, a computer system comprising a processor and instructions stored in a non-transitory machine-readable media that, when executed by the processor, cause the computer system to determine whether an RFID transponder is within a first threshold distance of an RFID reader, and provide a notification to a user when the RFID transponder is within the first threshold distance, thereby notifying the user when a distance between a hand of the user and a face of the user is less than a second threshold distance.

BRIEF DESCRIPTION OF THE FIGURES

The disclosure will become more fully understood from the following detailed description, taken in conjunction with the accompanying figures, wherein like reference numbers refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

In order to prevent disease from being transmitted from contaminated surfaces, it may be desirable to stop a user from touching his or her face. Preventing a user from facial touching can be done physically by PPE, or by training a user not to touch his or her face. Physical barriers such as PPE work well when they are worn, but are limited as they do not provide any protection from potential contaminants when not worn. Another limitation of physical barriers is that they may become contaminated and transmit contaminants. When not properly worn, cleaned, or disposed of, these physical barriers can transfer these contaminants onto the user.

Having a user completely avoid facial touching is the ideal solution to preventing this mode of transmittal. However, because facial touching is often done subconsciously, training a user to avoid facial touching can prove to be challenging.

Figure 1:
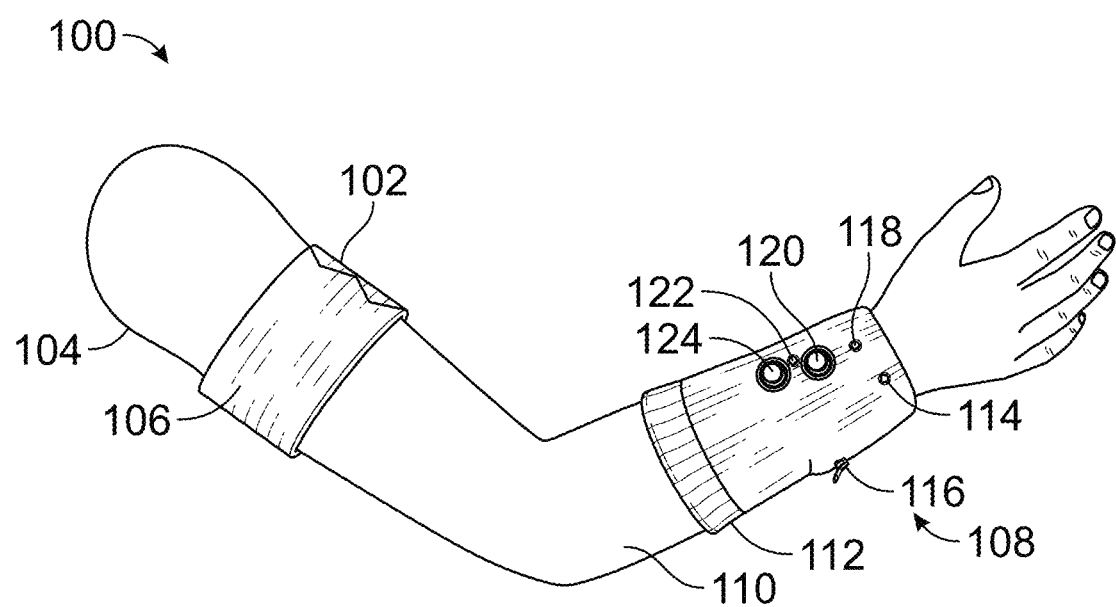
FIG. 1 is a side view of a first cuff and a second cuff, according to a particular embodiment.

FIG. 1 depicts a training system 100, according to an exemplary embodiment. The training system 100 may be configured to be worn on a user's arm. The training system 100 may be used in training the user to decrease or eliminate facial touching. Decreasing facial touching helps prevent transmission of disease when the user's hand comes into contact with a contaminated surface. The training system 100 consists of two cuffs that contain a RFID tag/transponder and a receiver. When the RFID transponder and the receiver come within range of each other, the training system 100 may alert the user of the potential facial touching. RFID is used as the effective range of certain RFID systems can be between 1 inch and 12 inches, such as 1-6 inches in one embodiment, which is suitable for use on the human body. Using an RFID system is advantageous as RFID systems are often sufficiently small such that the RFID system does not interfere with a user's standard activity. The system is intended to train a user to decrease or eliminate non-essential and subconscious facial touching. In some embodiments, the training system 100 can be used underneath clothing of any material (e.g., cotton, polyester, nylon, etc.). This allows a user to use the training system 100 under a uniform.

The training system 100 may include a first cuff 102 configured to be positioned on an upper arm 104 of the user. The first cuff 102 includes a proximity sensor (e.g., RFID, sonar, photo sensor, etc.). In some embodiments, the upper arm 104 may be on the left or the right arm of the user. The first cuff 102 may include a sensor position 106 configured to accept and store a proximity sensor (e.g., RFID, sonar, photo sensor, etc.). One embodiment of a sensor position 106 is further described with reference to FIG. 4. In some embodiments, the first cuff 102 may comprise a moisture wicking material (e.g., merino wool, polyester, nylon, etc.) and may be washable and shareable within multi-user settings (e.g., hand-wash, machine wash, etc.).

The training system 100 may include a second cuff 108 configured to be located on a lower arm 110 of the user. In some embodiments, the lower arm 110 may be on the left or the right arm of the user, wherein the second cuff 108 will be coupled to the same arm (i.e., left or right) as the first cuff 102. In some embodiments, the second cuff 108 includes a plurality of openings through which components may be accessed. In some embodiments, the second cuff 108 includes a plurality of markings denoting locations of various components of training system 100 underneath the second cuff 108.

The second cuff 108 may include a sleeve 112. The sleeve 112 is removably coupled to the lower arm 110 and houses components of the training system 100. In some embodiments, the sleeve 112 may comprise a moisture wicking material (e.g., merino wool, polyester, nylon, etc.) and may be washable (e.g., hand-wash, machine wash, etc.) and shareable within multi-user settings. In some embodiments, the sleeve 112 may have an internal pocket, in which the components of the training system 100 are housed and may include various devices for closing the internal pocket (e.g., zipper, buttons, hook-and-loop, etc.). In some embodiments, the sleeve 112 may include padding (e.g., foam) to prevent components of the training system 100 from damage. In some embodiments, the sleeve 112 may include additional components (e.g., straps, adhesives, etc.) that prevent the second cuff 108 from rotating around the lower arm 110 while worn.

The second cuff 108 may include a power switch opening 114. The power switch opening 114 may be an aperture in the sleeve 112 and may allow for a switch to be accessed while the second cuff 108 is worn on the lower arm 110. In some embodiments, the power switch opening 114 may include reinforcement (e.g., hem, glue, etc.) to prevent damage (e.g., fraying.).

The second cuff 108 may include a power source pouch 116. The power source pouch 116 is coupled with the sleeve 112. In some embodiments, the power source pouch 116 is integrated with the sleeve 112 (e.g., the power source pouch 116 and the sleeve 112 comprise a unitary component). The power source pouch 116 and the sleeve 112 may also be separate components that are coupled together (e.g., via an attachment mechanism, adhesive, etc.). The power source pouch 116 may be configurable between two positions, an "open" position and a "closed" position. In the "open" position, the power source pouch 116 exposes a power source (e.g., LiPo battery, Li-ion battery, etc.), and may allow for power source replacement. In the "closed" position, the power source pouch 116 is fastened shut. In some embodiments, the power source pouch 116 may be fastened using various types of fasteners (e.g., zippers, buttons, hook-and-loop, etc.) In some embodiments, the power source pouch 116 may be used to access other components of the training system 100.

The second cuff 108 may include an indicator light opening 118. The indicator light opening 118 is directly integrated into the sleeve 112. The indicator light opening 118 is defined by the sleeve and is sized to receive an illumination device and provide a space through which light from the illumination device can pass. The indicator light opening 118 may allow for light to pass through, allowing for a user to see the light when the second cuff 108 is worn on the lower arm 110. In some embodiments, a transparent or translucent material (e.g., glass, plastic, etc.) may be coupled to the second cuff 108 such that the indicator light opening 118 is covered by the transparent or translucent material, thereby providing protection for the illumination component. In some embodiments, the indicator light opening 118 may include reinforcement (e.g., hem, glue, etc.) to prevent damage (e.g., fraying).

The second cuff 108 may include a screen window 120. The screen window 120 is directly integrated into the sleeve 112. The screen window 120 is defined by the sleeve and is sized to receive a display device (e.g., LCD screen, LED screen, etc.) and provide a space through which the information displayed by the display device can pass. The screen window 120 may allow for the user to see at least one internal component of the training system 100. In some embodiments, the screen window 120 includes a transparent material (e.g., glass plastic.). In some embodiments, the screen window 120 may include reinforcement (e.g., hem, glue, etc.) to prevent damage (e.g., fraying).

The second cuff 108 may include a battery light opening 122. The battery light opening 122 is directly integrated into the sleeve 112. The battery light opening 122 is defined by the sleeve and is sized to receive an illumination device and provide a space through which light from the illumination device can pass. The battery light opening 122 may allow for light to pass through, allowing for a user to see the light when the second cuff 108 is worn on the lower arm 110. In some embodiments, the battery light opening 122 may include a transparent or translucent material (e.g., glass plastic, etc.). In some embodiments, the battery light opening 122 may include reinforcement (e.g., hem, glue, etc.) to prevent damage (e.g., fraying).

The second cuff 108 may include a speaker opening 124. The speaker opening 124 is directly integrated into the sleeve 112. The speaker opening 124 is defined by the sleeve and is sized to receive an audio device (e.g., speaker, microphone, etc.) and provide a space through which light from the illumination device can pass. The speaker opening 124 allows for sound waves to pass through without muffling or interference. In some embodiments, the speaker opening 124 may include a cover (e.g., mesh, thin fabric, etc.) to protect internal components from contaminants (e.g., dust, dirt, etc.). In some embodiments, the speaker opening 124 may include reinforcement (e.g., hem, glue, etc.) to prevent damage (e.g., fraying).

Figure 2:
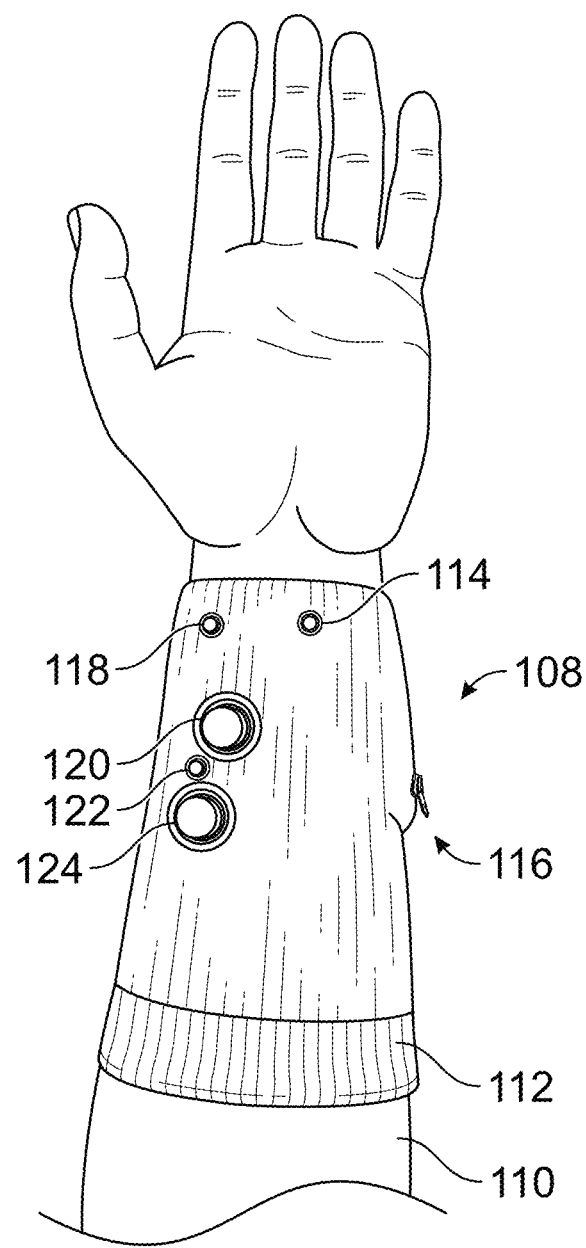
FIG. 2 is a bottom view of the second cuff from FIG. 1.

FIG. 2 depicts a bottom view of the second cuff 108, according to an exemplary embodiment. In this embodiment, the second cuff 108 is configured such that access to the functions of the second cuff 108 is on the inside of the lower arm 110 (i.e., palm-side). In some embodiments, the second cuff 108 may be configured to be rotated and translated anywhere along the lower arm 110. In some embodiments, the components of the second cuff 108 may be positioned differently. Positioning can provide additional functionally and accessibility benefits for a user.

Figure 3:
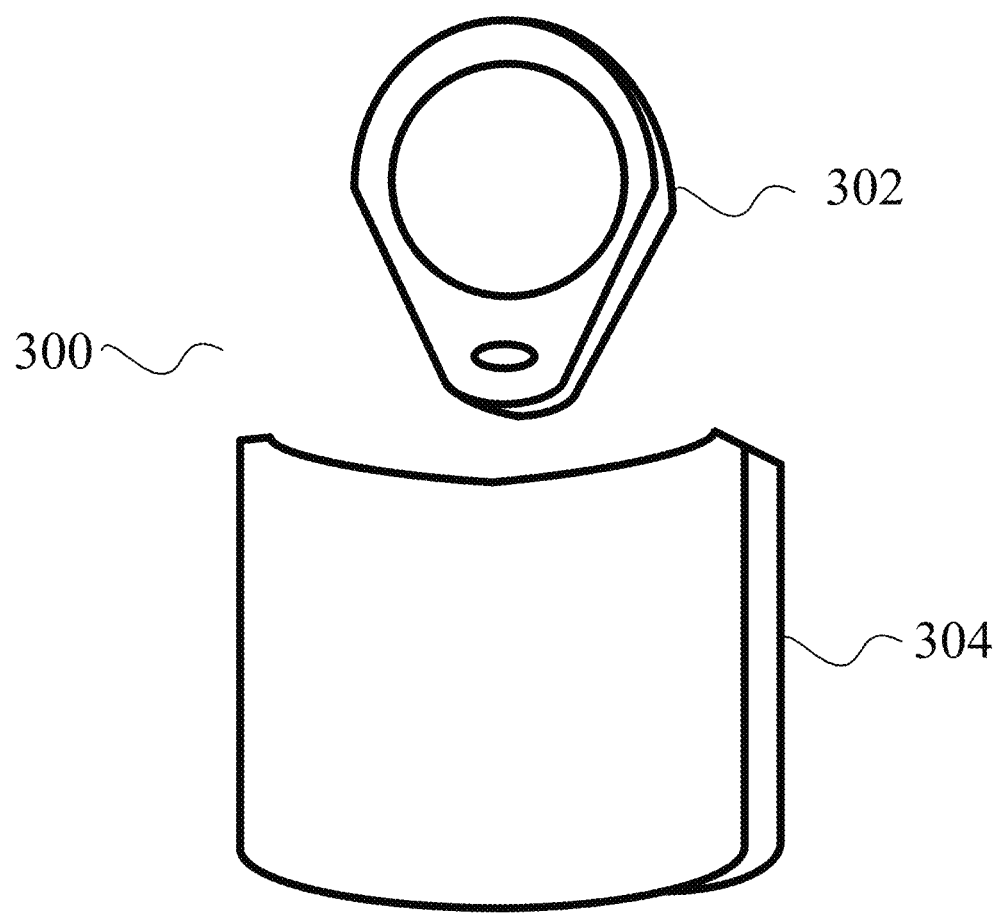
FIG. 3 illustrates an exploded view of a RFID transponder system, according to a particular embodiment.

FIG. 3 depicts an exploded view of a transponder system 300. The transponder system 300 is positioned inside the first cuff 102. The transponder system 300 includes a RFID transponder 302. In some embodiments, the RFID transponder 302 may be a RFID transponder of any type (e.g., active tag, passive tag, semi-passive tag, etc.). The transponder system 300 includes a transponder holder 304. In one embodiment, the transponder holder 304 includes a slot in which the RFID transponder 302 is positionable. Such a slot may be configured between an open position and a closed position. The slot may be secured in the closed position by a fastener (e.g., clasp, magnets, zipper, button, hook-and-loop, etc.).

Figure 4:
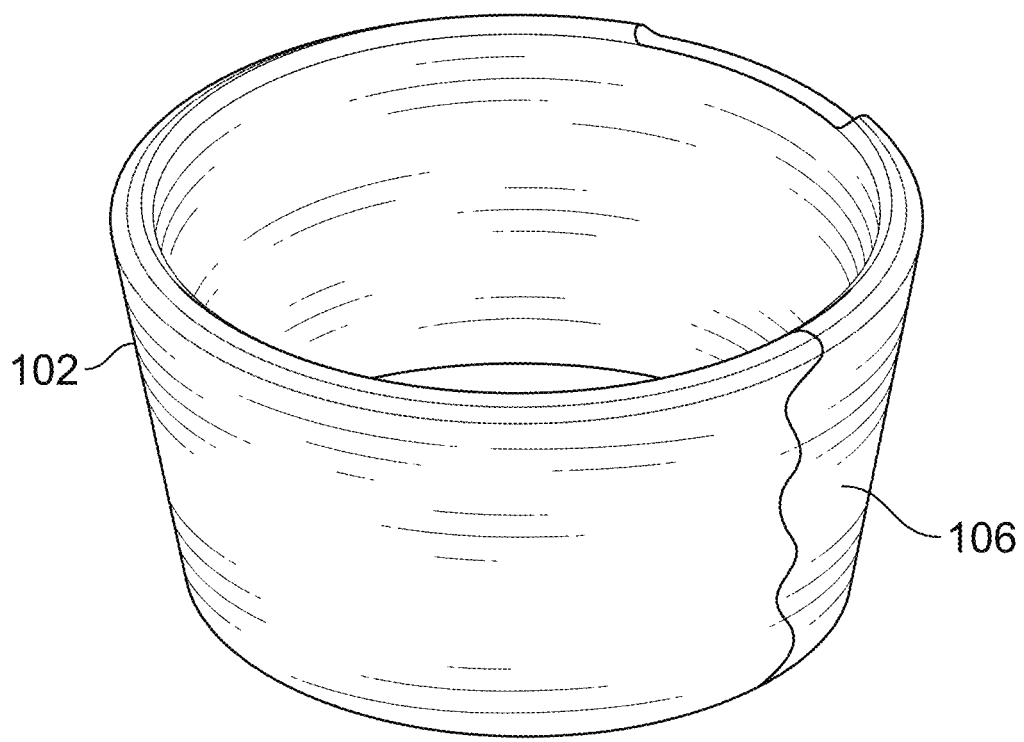
FIG. 4 illustrates a perspective view of the first cuff from FIG. 1.

FIG. 4 depicts a perspective view of the first cuff 102, according to a particular embodiment. In one embodiment, the first cuff 102 includes a sensor position 106. The sensor position 106 allows for the transponder system 300 to be secured to the first cuff 102. The sensor position 106 may be configured between an open position and a closed position. The sensor position 106 may be secured in the closed position by a fastener (e.g., clasp, magnets, zipper, button, hook-and-loop, etc.) In some embodiments the sensor position 106 may be an external coupling location that allows for the transponder system 300 to be removably coupled (e.g., magnetic, hook-and-loop, adhesive, etc.) to the outer face of the first cuff 102. For example, a hook-and-loop system may be secured to both the outer face of the cuff and to the transponder system. In such embodiments, the transponder system is configured to be coupled to the cuff by causing the hook-and-loop systems to interface with each other. In some embodiments, the transponder system 300 may be permanently coupled (e.g., sewn, adhered, etc.) to the sensor position 106.

Figure 5:
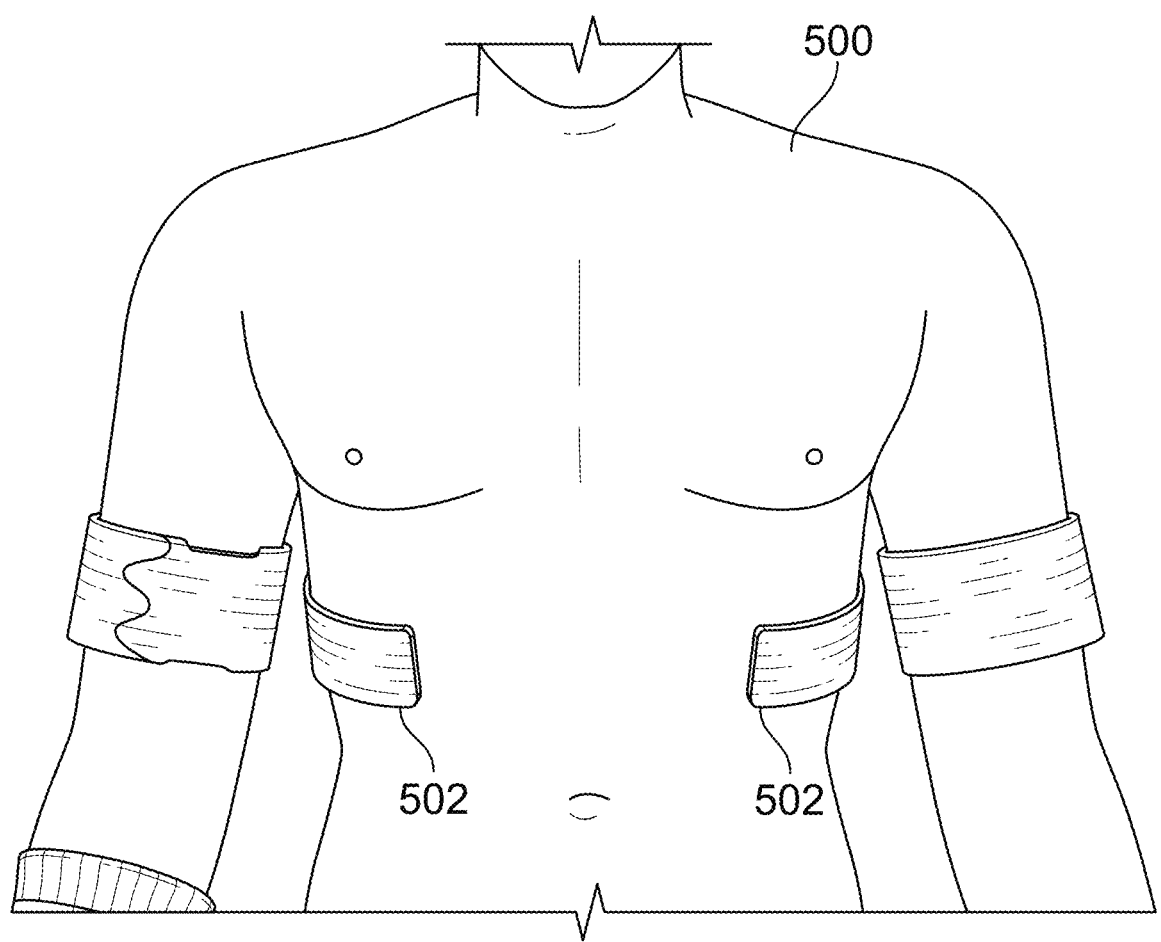
FIG. 5 is a front view of a RFID transponder coupled to a torso, according to a particular embodiment.

FIG. 5 depicts a front view of a torso system 500, according to an exemplary configuration. The torso system 500 may be implemented instead of, or in conjunction with, the first cuff 102 in the training system 100. The torso system 500 includes one or more torso transponder 502 coupled (e.g., with adhesive, suction, etc.) to a torso 504. In some embodiments, the torso transponder 502 may be coupled to the torso 504 using a torso strap (not shown) that wraps around the torso 504. In some embodiments, the torso transponder 502 may be positioned anywhere on the torso 504 to allow for varying the functionality of the training system 100. The torso transponder 502 may include a RFID tag. In some embodiments, the RFID transponder of the torso transponder 502 may be a RFID transponder of any type (e.g., active tag, passive tag, semi-passive tag, etc.). In some embodiments, the torso transponder 502 may include a housing (e.g., plastic, fabric, etc.), in which the RFID transponder is stored.

Figure 6:
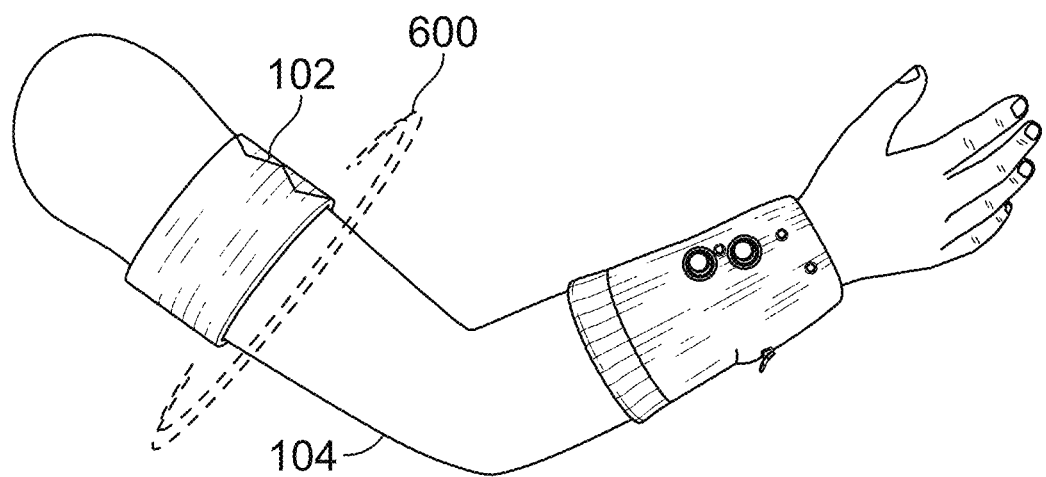
FIG. 6 illustrates a rotation of the first cuff from FIG. 1, according to a particular embodiment.

FIG. 6 depicts an intended rotation of the first cuff 102 about a path of rotation 600 on the upper arm 104. Rotating the first cuff 102 about the path of rotation 600 allows for a repositioning of the RFID transponder 302 in relation to the second cuff 108. For example the first cuff 102 can be rotated to position the RFID transponder on the inside of the upper arm (i.e., such that the transponder is between the upper arm and the torso). The first cuff 102 can also be rotated to position the RFID transponder on the outside of the upper arm (i.e., such that the upper arm is between the torso and the RFID transponder). The first cuff 102 can also be rotated to any other position on the upper arm.

Figure 7:
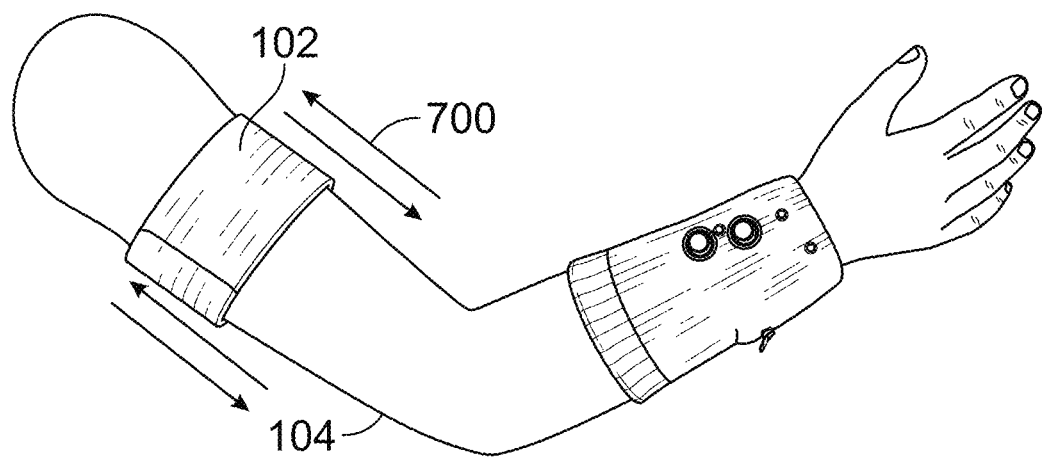
FIG. 7 illustrates a linear movement of the first cuff from FIG. 1, according to a particular embodiment.

FIG. 7 depicts an intended translation of the first cuff 102 about a translation axis 700 on the upper arm 104. Translating the first cuff 102 about the translation axis 700 allows for a repositioning of the RFID transponder 302 in relation to the second cuff 108. For example, the first cuff 102 can be positioned on the upper arm such that the first cuff 102 is located near the shoulder, or the first cuff 102 can be positioned on the upper arm such that the first cuff 102 is located near the elbow. The first cuff 102 can also be positioned anywhere along the first arm.

Adjusting the position of the first cuff 102, such as in FIG. 6 and FIG. 7, allows the user to adjust how close the user may bring a hand to his or her face to bring the RFID transponder in range of the RFID receiver. The distance between the RFID transponder and the RFID receiver and the distance a user may bring a hand to his or her face is inversely proportional. For example, to maximize the distance between the RFID transponder and the RFID receiver, the user may position the first cuff 102 such that the cuff is located close to the shoulder and the first cuff 102 is rotated such that the RFID transponder is on the back of the upper arm (i.e., along the triceps). In this configuration, the user is able to minimize the distance between the user's hand and face before the RFID transponder and RFID receiver are within range. Conversely, if the user wanted to maximize the distance between the hand and face before the RFID transponder and RFID receiver are within range, the user would position the first cuff 102 such that the first cuff 102 is located near the elbow and rotated such that the RFID transponder is located on the inside of the arm (i.e., along the bicep).

Figure 8:
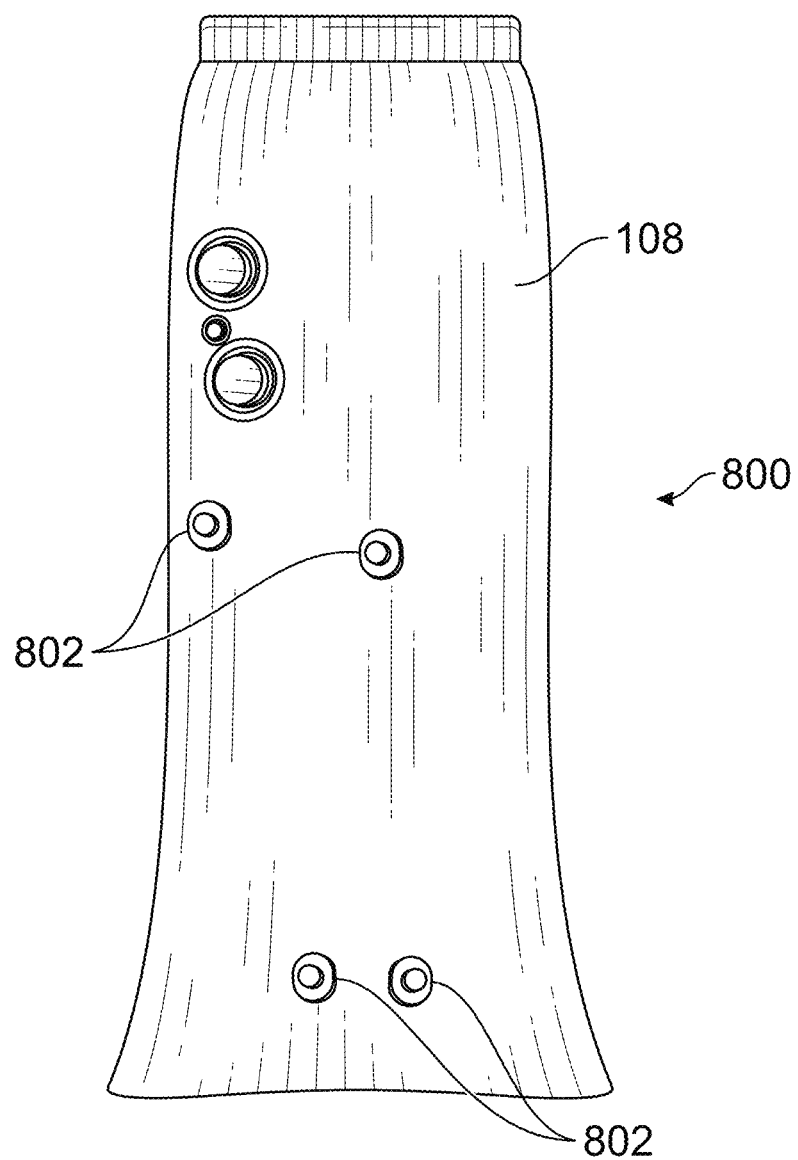
FIG. 8 is a first view of an inner surface of the second cuff from FIG. 1 without the computer system, according to a particular embodiment.

FIG. 8 depicts a first view of an inner surface 800 of the second cuff 108. The inner surface 800 of the second cuff 108 includes a plurality of attachment points 802. The attachment point may be any type of coupling system (e.g., nut-and-bolt, magnetic, hook-and-loop, adhesive, etc.) The attachment points 802 are configured to fixedly couple to the interchangeable computer system such that the computer system will not detach from the second cuff 108 during use. In some embodiments, the attachment points 802 may be any suitable type of attachment (e.g., magnetic, hook-and-loop, adhesive, etc.).

Figure 9:
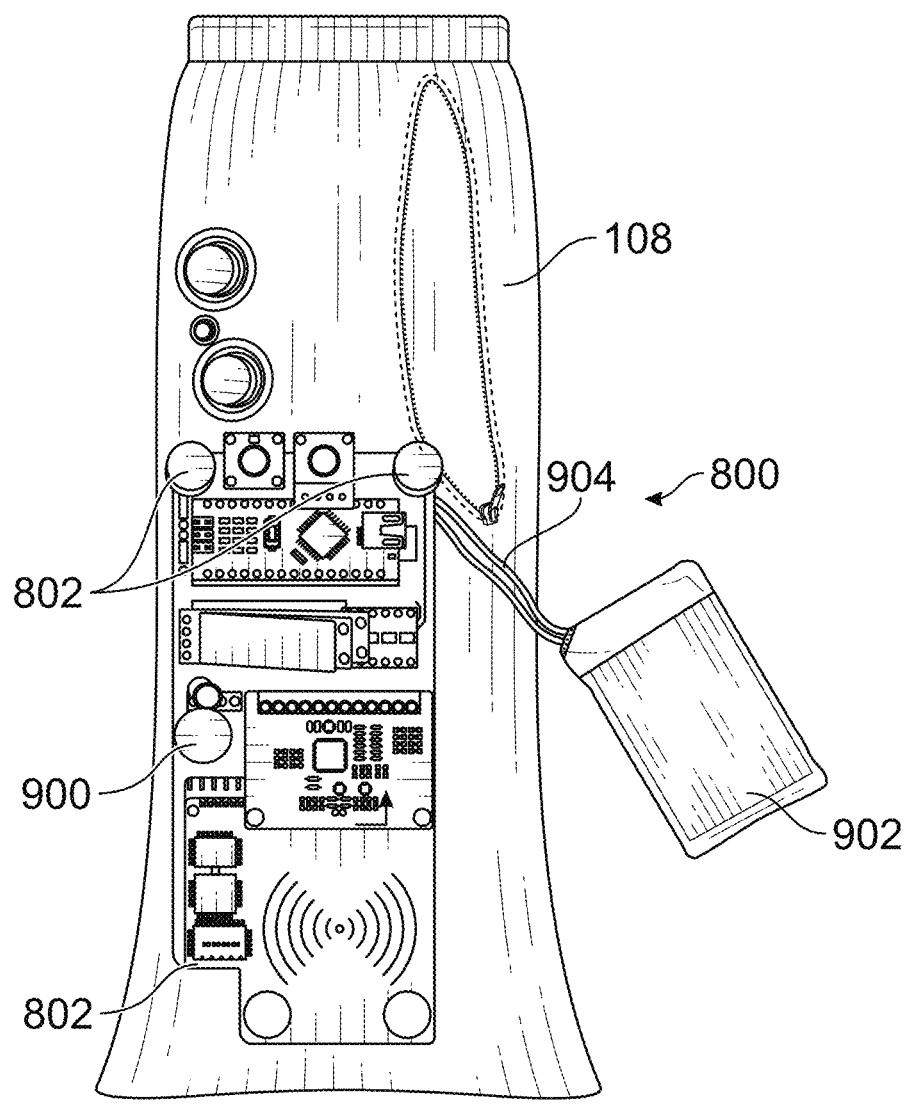
FIG. 9 is a second view of the inner surface of the second cuff from FIG. 1 without the computer system, according to a particular embodiment.

FIG. 9 depicts the first view of the inner surface 800 of the second cuff 108 with an interchangeable computer system 900 attached. The computer system 900 is coupled (e.g., permanently, selectively, etc.) to the second cuff 108 by a plurality of attachment points 802. Coupling the computer system 900 to the second cuff 108 allows for the computer system 900 to remain in the same position relative to the second cuff 108. Fixing the computer system 900 to the same position relative to the second cuff 108 allows for the openings of the second cuff 108 (e.g., speaker opening 124, etc.) to be located in their correct positions over the corresponding components of the computer system 900.

FIG. 9 also depicts a power source 902. In some embodiments, the power source 902 may be any type of power source configured to provide electrical power (e.g., Li-ion battery, Li—Po battery, etc.). In some embodiments, the power source 902 may include a housing (e.g., impact-absorbing, waterproof, etc.) that may protect the power source 902. In some embodiments, the power source 902 may be rechargeable. The power source 902 delivers electrical power to the computer system 900 through a power connector 904. The power connector 904 may comprise any electrically conductive material (e.g., copper) and may include an insulating coating (e.g., plastic, rubber, etc.). In some embodiments the power source 902 may selectively couple to the power connector 904 by any type of connector (e.g., T-plug, bullet plug, XT60, etc.) In some embodiments, the power connector 904 may selectively couple to the computer system 900 by any type of connector (e.g., T-plug, bullet plug, XT60, etc.).

Figure 10:
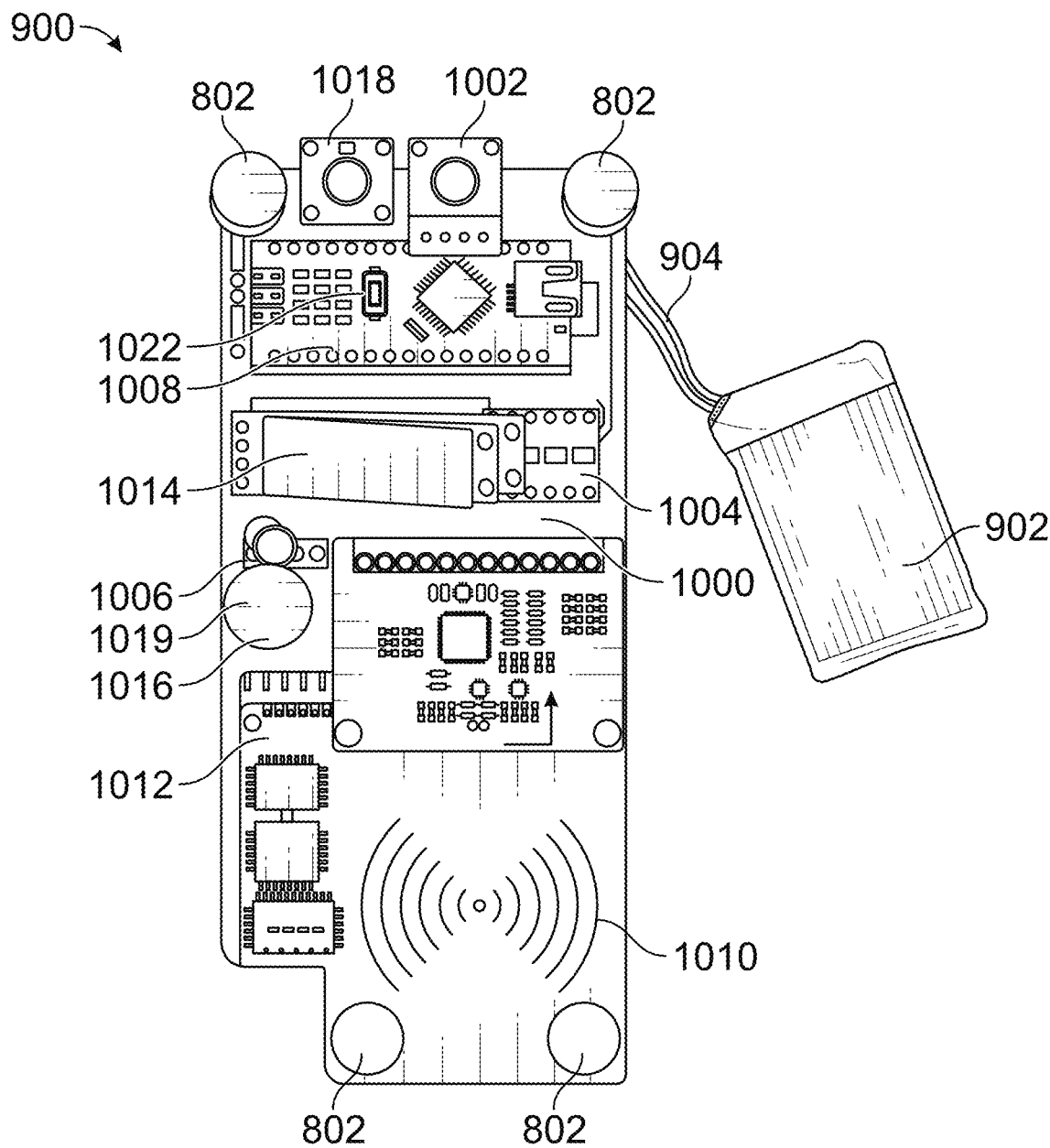
FIG. 10 is a top view of the computer system of the training system of FIG. 1, according to a particular embodiment.

FIG. 10 depicts a top view of the interchangeable computer system 900, according to a particular embodiment. The computer system 900 facilitates the functionality of the training system 100. In some embodiments, such as the one depicted in FIG. 10, the computer system 900 includes a printed circuit board 1000. The printed circuit board 1000 provides a base for the components of the computer system 900. The printed circuit board 1000 includes electrically conductive tracks that allow for electrical current and signals to be transmitted without the use of wires. A benefit of using the printed circuit board 1000 is that printed circuit boards allow for circuits to have a lower profile and reduce the risk of circuit components being disconnected during use. In some embodiments, the printed circuit board 1000 may be replaced with other circuit management systems (e.g., breadboard, hardwired, etc.).

In some embodiments, such as the one depicted in FIG. 10, the computer system 900 includes a power switch 1002 coupled (e.g., soldered, by a wire, etc.) to the printed circuit board 1000. In some embodiments, the computer system 900 may always be in an on (i.e., powered) status. The power switch 1002 may be configured to toggle the computer system 900 between two positions: an "on" position and an "off" position. When the power switch 1002 is in the "on" position, the switch allows for electrical current to flow from the power source to the computer system 900. When the power switch 1002 is in the "off" position, electrical current may not flow from the power source to the computer system 900. The power switch 1002 allows for the user to conserve energy when the training system 100 is not in use. In some embodiments, the power switch 1002 may be any type of switch (e.g., toggle, push-button, selector, etc.). In some embodiments, the power switch 1002 may control software functions intended to emulate analog electrical functions.

In some embodiments, such as the one depicted in FIG. 10, the computer system 900 includes a power converter 1004 coupled (e.g., soldered, by a wire, etc.) to the printed circuit board 1000. The power converter 1004 is electrically coupled to the power source 902. When the power converter 1004 receives electrical current from the power source 902, the power converter 1004 converts the electrical energy to the correct voltage, frequency, and type (e.g., alternating current, direct current) needed by the computer system 900. For example, the power converter 1004 may take in 120V alternating current and will convert this to a 6V direct current, which may be used by the computer system 900 in this exemplary embodiment. The power converter 1004 then directs the converted current to the printed circuit board to correctly power the components of the computer system 900 as needed. In some embodiments, the power converter 1004 may complete multiple conversions to result in the needed current and voltage. In some embodiments, a power converter 1004 may not be necessary as the power source 902 may be configured to provide the correct voltage, frequency, and type (e.g., alternating current, direct current) needed by the computer system 900.

In some embodiments, such as the one depicted in FIG. 10, the computer system 900 includes a power level light 1006 coupled (e.g., soldered, by a wire, etc.) to the printed circuit board 1000. The power level light 1006 receives electrical current from the power converter 1004. In some embodiments, the power level light 1006 may include its own power source (e.g., Li—Po battery, Li-ion battery, etc.). The power level light 1006 indicates to the user the status (e.g., charge remaining) of the power source 902. In some embodiments, the power level light 1006 may be any type of electrical light source (e.g., LED, incandescent, etc.). In some embodiments, the power level light 1006 may only turn on when the charge remaining in the power source 902 is below a certain threshold. In other embodiments the characteristics (e.g., color, intensity, etc.) of the power level light 1006 may be used to indicate the status of the power source 902. For example, the power level light 1006 may be green when the charge remaining in the power source 902 is high and the power level light 1006 may turn orange when the charge remaining in the power source 902 is low. In some embodiments, the remaining charge of the power source 902 may be communicated in a different component (e.g., screen, vibrational component, etc.) or may be completely omitted.

In some embodiments, such as the one depicted in FIG. 10, the interchangeable computer system 900 includes a microcontroller 1008 coupled (e.g., soldered, by a wire, etc.) to the printed circuit board 1000. The microcontroller 1008 receives electrical current from the power converter 1004. In some embodiments, the microcontroller 1008 may include its own power source (e.g., Li—Po battery, Li-ion battery, etc.). The microcontroller 1008 may read in signals from any components from the computer system 900 and may send signals to any components of the computer system 900. The microcontroller 1008 includes one or more processors and a memory. The memory may be a non-transitory memory that includes instructions. The memory may include database components, object code components, script components, or any other type of information structure for supporting the various activities and information structures described in the present application. In some embodiments, a different device (e.g., application processor, mobile phone, single-board-computer, etc.) may be used to send and receive the signals of computer system 900.

The computer system 900 includes a RFID module 1010 coupled (e.g., soldered, by a wire, etc.) to the printed circuit board 1000. The RFID module 1010 receives electrical current from the power converter 1004. In some embodiments, the RFID module 1010 may include its own power source (e.g., Li—Po battery, Li-ion battery, etc.). The RFID module 1010 includes a RFID reader. The RFID module 1010 is configured to wirelessly communicate with an RFID tag, such as the RFID transponder 302. To communicate with an RFID tag, the RFID module 1010 must first be bound (i.e., configured to interact with) with the RFID tag. When a RFID transponder bound to the RFID module 1010 comes within range (i.e., when the RFID module 1010 can detect the RFID tag) of the RFID module 1010, the RFID module 1010 sends a signal to the other components of the computer system 900. In some embodiments, the RFID module may be any type of RFID system (e.g., passive reader active tag, active reader passive tag, active reader active tag). In some embodiments, the RFID module 1010 may be configured to bind with multiple RFID tags.

The computer system 900 includes a wireless connectivity module 1012 coupled (e.g., soldered, by a wire, etc.) to the printed circuit board 1000. The wireless connectivity module 1012 receives electrical current from the power converter 1004. In some embodiments, the wireless connectivity module 1012 may include its own power source (e.g., Li—Po battery, Li-ion battery, etc.). The wireless connectivity module 1012 may pair (i.e., be configured to wirelessly connect with a device) with a device such that the device may send signals to and receive signals from the wireless connectivity module 1012. The wireless connectivity module 1012 is configured to receive signals from other components of the computer system 900 and send signals to the paired device. For example, the wireless connectivity module 1012 may receive a signal from the RFID module 1010 that an RFID transponder is in range. The wireless connectivity module 1012 may then transmit this signal to a paired device, such as a mobile telephone. In some embodiments, the wireless connectivity module 1012 may be any type of wireless connection device (e.g., Bluetooth, Wi-Fi, etc.). In some embodiments, the wireless connectivity module 1012 may be replaced with a port (e.g., USB-C, microUSB, etc.) that may couple with a data transfer cable to send data and/or signals generated by the computer system 900 to an external source. In some embodiments, the wireless connectivity module 1012 may be paired to more than one device.

In some embodiments, such as the one depicted in FIG. 10, the computer system 900 includes a screen 1014 coupled (e.g., soldered, by a wire, etc.) to the printed circuit board 1000. The screen 1014 receives electrical current from the power converter 1004. In some embodiments, the screen 1014 may include its own power source (e.g., Li—Po battery, Li-ion battery, etc.). The screen 1014 may display information (e.g., time of day, etc.) or notifications (e.g., low battery alert, etc.) to the user. For example, the screen 1014 may be used to display the number of times the RFID transponder 302 has been within range of the RFID module 1010. In some embodiments, the screen 1014 may display notifications sent by a device paired to the wireless connectivity module. In some embodiments, the screen 1014 may be any type of display device (e.g., light-emitting diode, organic light-emitting diode, liquid crystal display, etc.).

In some embodiments, such as the one depicted in FIG. 10, the interchangeable computer system 900 includes an indicator light 1016 coupled (e.g., soldered, by a wire, etc.) to the printed circuit board 1000. The indicator light 1016 receives electrical current from the power converter 1004. In some embodiments, the indicator light 1016 may include its own power source (e.g., Li—Po battery, Li-ion battery, etc.). The indicator light 1016 may be configured to illuminate when an RFID transponder is in range of the RFID module 1010. The indicator light is intended to draw the attention of the user, so that the user may become aware of potential facial touching. In some embodiments, the indicator light 1016 may flash (i.e., cycle between degrees of illumination) to better alert the user. In some embodiments, the indicator light 1016 may be any type of electrical light source (e.g., LED, incandescent, etc.). In some embodiments, the function of the indicator light 1016 may double as the function of the power level light 1006.

In some embodiments, such as the one depicted in FIG. 10, the computer system 900 includes a speaker 1018 coupled (e.g., soldered, by a wire, etc.) to the printed circuit board 1000. The speaker 1018 receives electrical current from the power converter 1004. In some embodiments, the speaker 1018 may include its own power source (e.g., Li—Po battery, Li-ion battery, etc.). The speaker 1018 is configured to convert signals from other components of the computer system 900 into a sound. The speaker 1018 may be configured to produce a sound when an RFID transponder is in range of the RFID module 1010. The speaker 1018 is intended to draw the attention of the user, so that the user may become aware of potential facial touching. In some embodiments, the speaker 1018 may produce a sound announcing the total number of facial touching occurrences. In some embodiments, the speaker 1018 may be any type of audio signaling device (e.g., mechanical, electromechanical, piezoelectric, etc.).

In some embodiments, such as the one depicted in FIG. 10, the computer system 900 includes a mute button 1020 coupled (e.g., soldered, by a wire, etc.) to the printed circuit board 1000. The mute button 1020 is configured to send signals to other components of the computer system 900 and may affect the functionality of the computer system 900. When activated, the mute button 1020 may stop the functionality of at least one indicating system (e.g., one or more of the indicator light 1016 and the speaker 1018) such that the user is not notified when an RFID transponder is in range of the RFID module 1010. This allows the user to practice avoiding facial touching without any indicators alerting the user of facial touching. This process may be used to determine if the user is fully trained (i.e., either avoids facial touching completely or has decreased facial touching below a threshold) by simulating a situation where the user is not wearing the training system 100. In some embodiments, the functionality of the mute button 1020 may be varied by the user according to preference. In some embodiments, the mute button 1020 may be any type of switch (e.g., toggle, push-button, selector, etc.).

In some embodiments, such as the one depicted in FIG. 10, the computer system 900 includes a reset button 1022 coupled (e.g., soldered, by a wire, etc.) to the printed circuit board 1000. The reset button 1022 is configured to send signals to the other components of the computer system 900 and may affect the functionality of the computer system 900. When activated, the reset button 1022 may reset the internal occurrence counter of the computer system 900 to zero. For example, if the computer system 900 has detected 9 occurrences of an RFID transponder being in range of the RFID module, pressing the reset button 1022 would reset the occurrence counter to zero. Having a reset button may allow for the training system 100 to be used to track facial touching on separate days or may allow for multiple users to use the same training system 100. In some embodiments, when the reset button 1022 is activated, the computer system 900 may save the occurrence count to a component having a memory before the occurrence counter is reset to zero. In some embodiments, the reset button 1022 may change the information displayed on the screen 1014. In some embodiments, the reset functionality may be switched on using a different input device (e.g., gesture sensor, audio sensor, mobile device, etc.).

Figure 11:
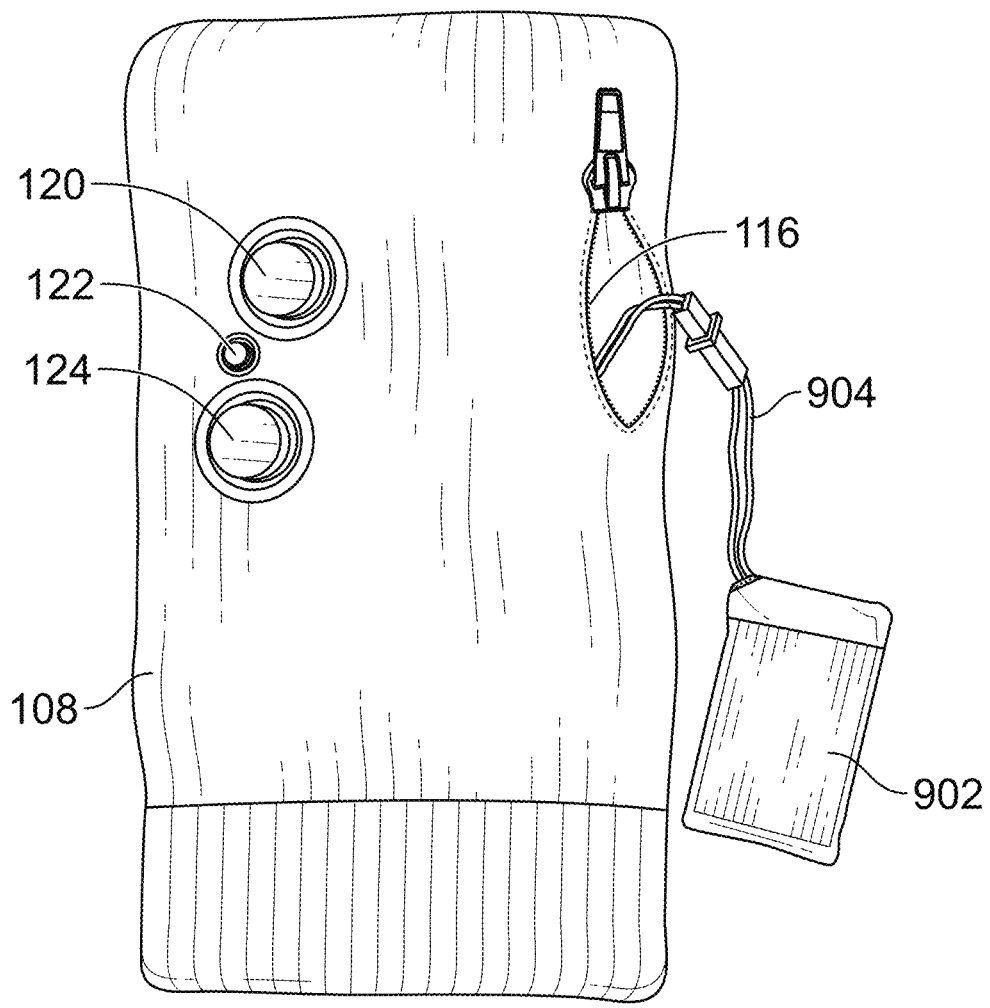
FIG. 11 is a top view of the second cuff from FIG. 1 in a first configuration.

FIG. 11 depicts a top view of the second cuff 108 with the power source 902 and the power connector 904 exposed. In this embodiment, the power source pouch 116 is open and the power source 902 is removed from the inside of the second cuff 108. This allows for the user to replace the power source 902 or to remove the power source 902 for charging. In some embodiments, the power source pouch 116 may provide access to other components of the computer system 900 housed within the second cuff 108.

Figure 12:
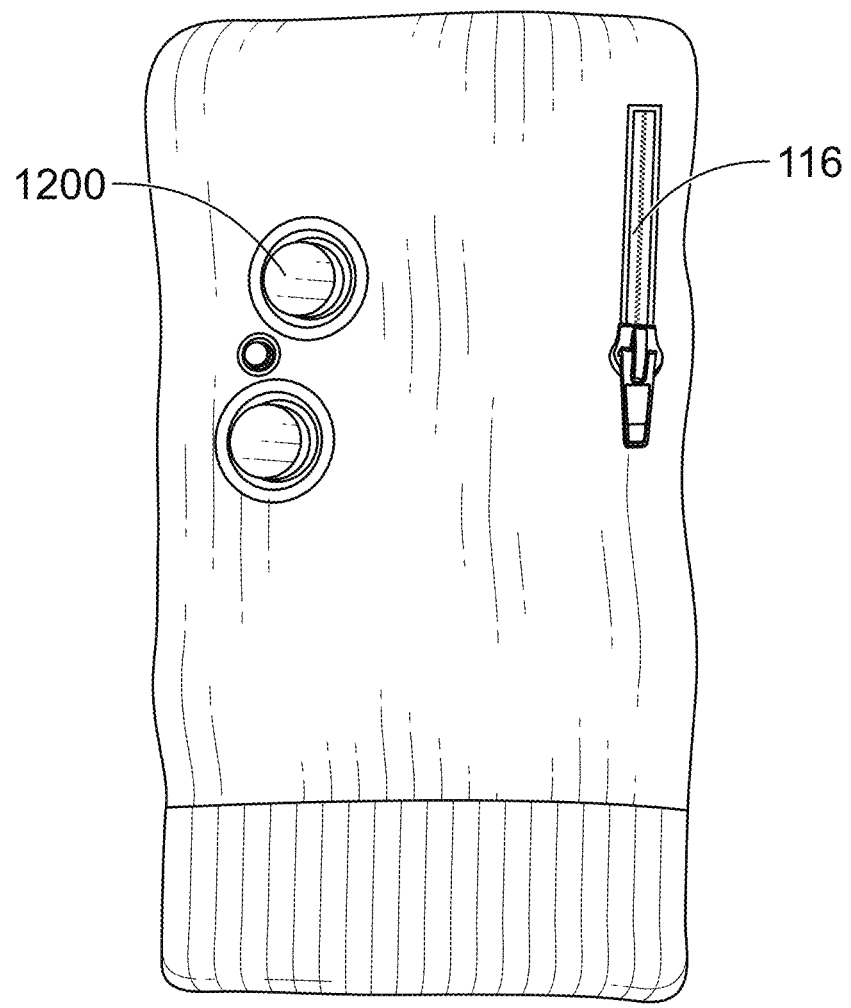
FIG. 12 is a top view of the second cuff from FIG. 1 in a second configuration.

FIG. 12 depicts a top view of the second cuff 108 with the power source pouch 116 closed. In this embodiment, the power source 902 and the power connector 904 are enclosed within the power source pouch 116. This embodiment may protect the power source 902 from damage and prevents the power source 902 from impeding regular functionality of the training system 100.

Figure 13:
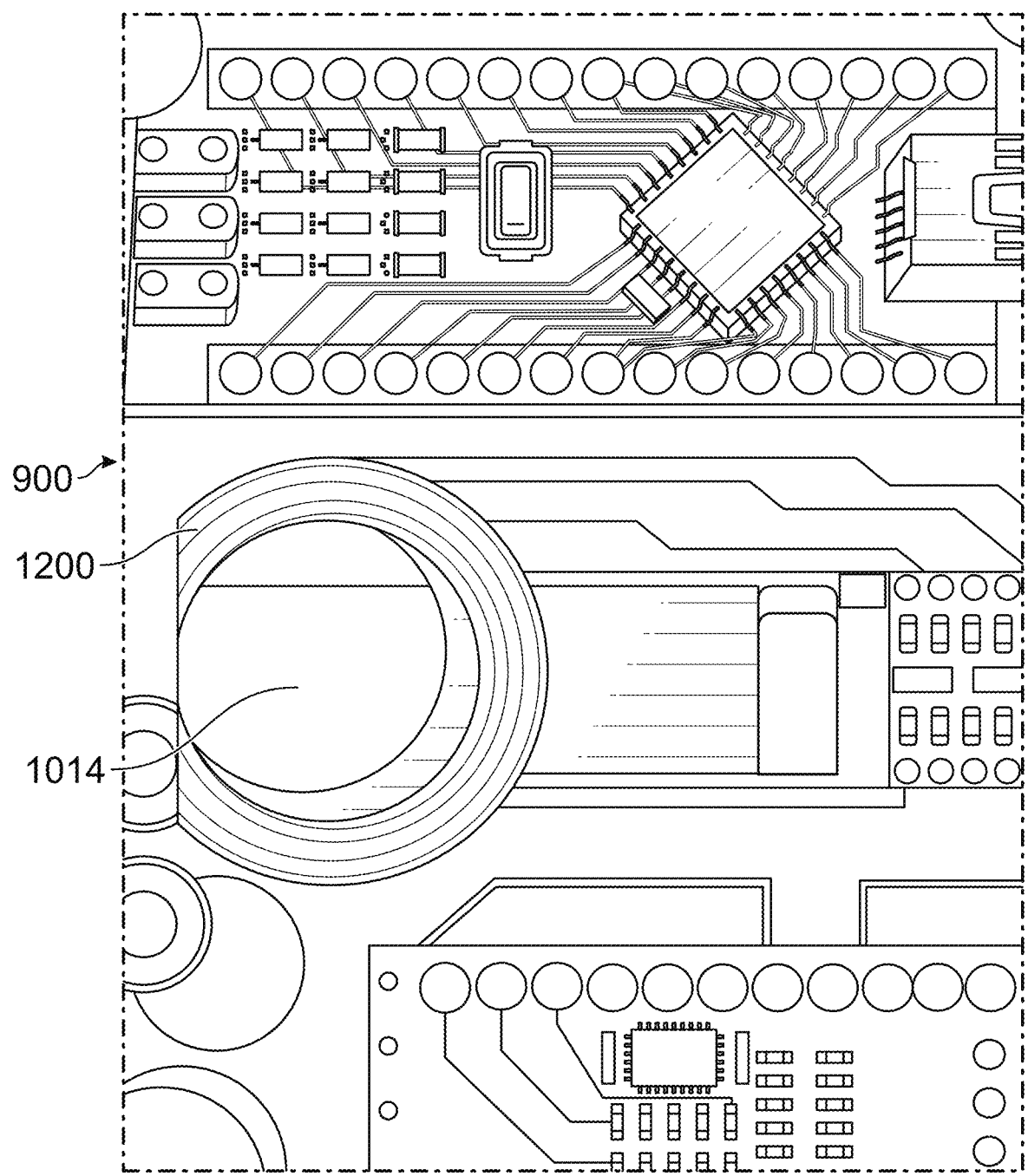
FIG. 13 illustrates a top view of an attachment structure of the computer system of FIG. 7, according to a particular embodiment.

FIG. 13 depicts a close-up top view of the computer system 900. The computer system 900 includes a locking ring 1200 coupled to the printed circuit board 1000. The locking ring 1200 is positioned around the screen 1014 and is configured to couple (e.g., selectively, fixedly, etc.) with the inner portion of the screen window 120. Coupling the locking ring 1200 to the screen window 120 allows for the screen window 120 to always be positioned above the screen 1014, allowing the user to see the screen 1014. In some embodiments, the locking ring may be any type of coupling device (e.g., locking ring, hook-and-loop, etc.).

Figure 14:
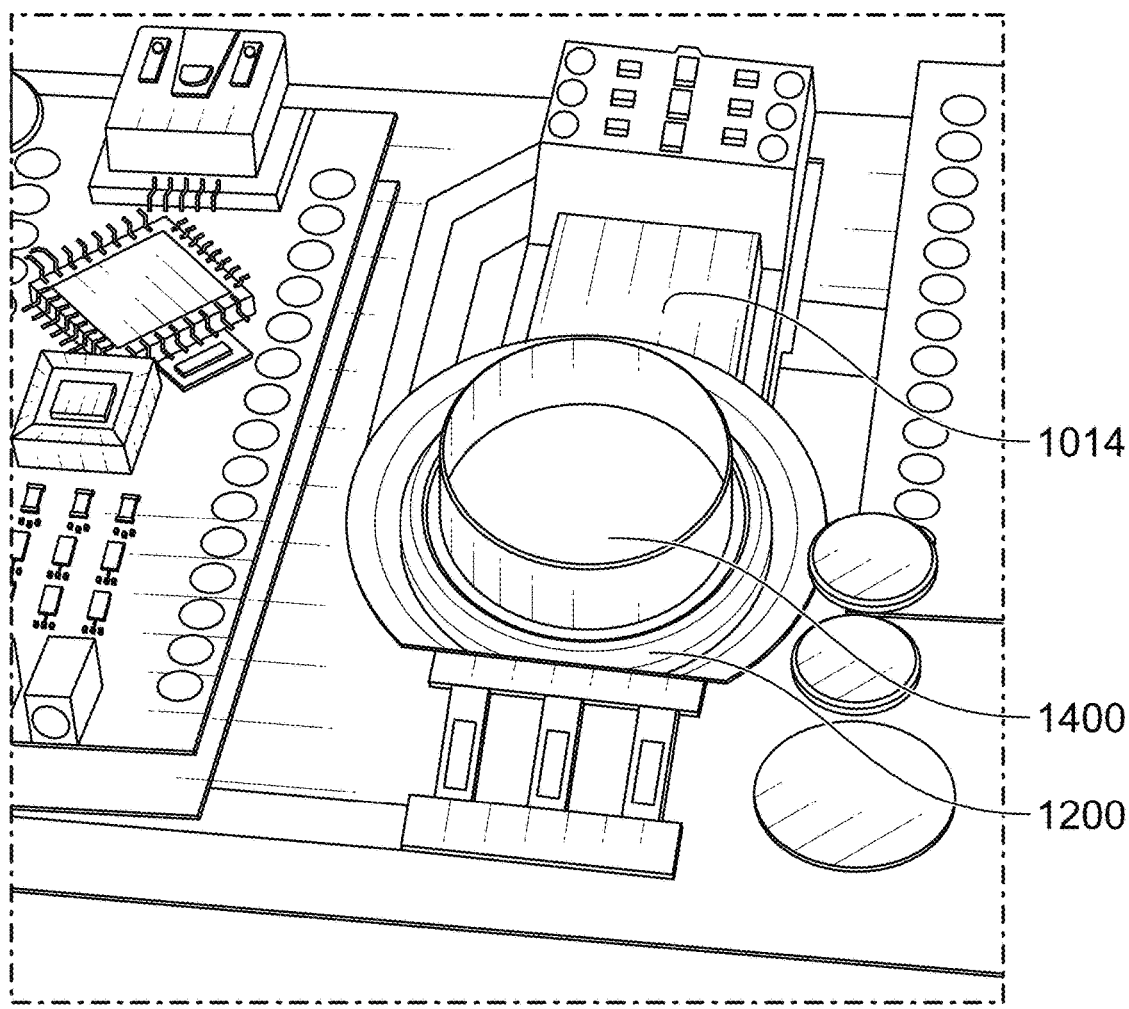
FIG. 14 is an oblique view of the attachment structure of the computer system from FIG. 7.

FIG. 14 depicts an oblique view of the computer system 900. In this embodiment, the locking ring 1200 includes a magnifying lens 1400. The magnifying lens 1400 enlarges the information displayed on the screen 1014, such that the information may be easier seen by the user. In some embodiments, the magnifying lens 1400 may be configured to allow users with visual impairments to use the training system 100.

In some embodiments, the magnifying lens may be any transparent material (e.g., glass, plastic, etc.). In some embodiments, the magnifying lens may be any type of lens (e.g., converging, diverging, concave, convex).

Figure 15:
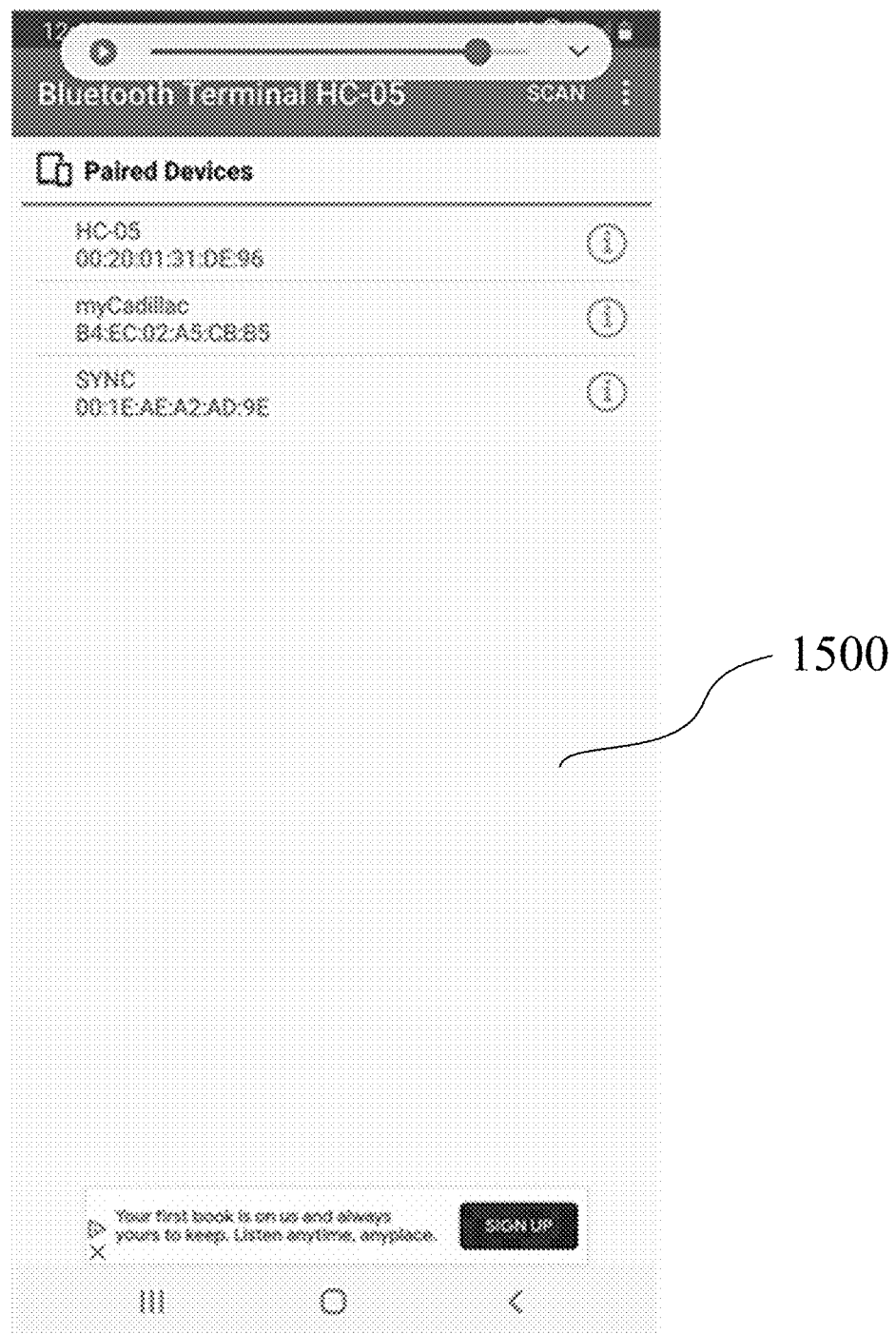
FIG. 15 is an example of a graphical user interface used to monitor the training system, according to a particular embodiment.

FIG. 15 depicts an exemplary screenshot of a pairing screen 1500. The pairing screen 1500 is an exemplary screenshot from a mobile device application configured to wirelessly couple to the training system 100. The pairing screen 1500 is used to manage wireless coupling with the training system 100. For example, the pairing screen 1500 may be used to pair to the training system 100 or may be used to disconnect the training system 100 from a paired device. In some embodiments, there may be a pairing procedure displayed on the pairing screen 1500 for pairing the mobile device to the training system 100. In some embodiments, the pairing screen 1500 may be used to adjust the settings and functionality of the training system 100 that has been paired with a mobile device.

Figure 16:
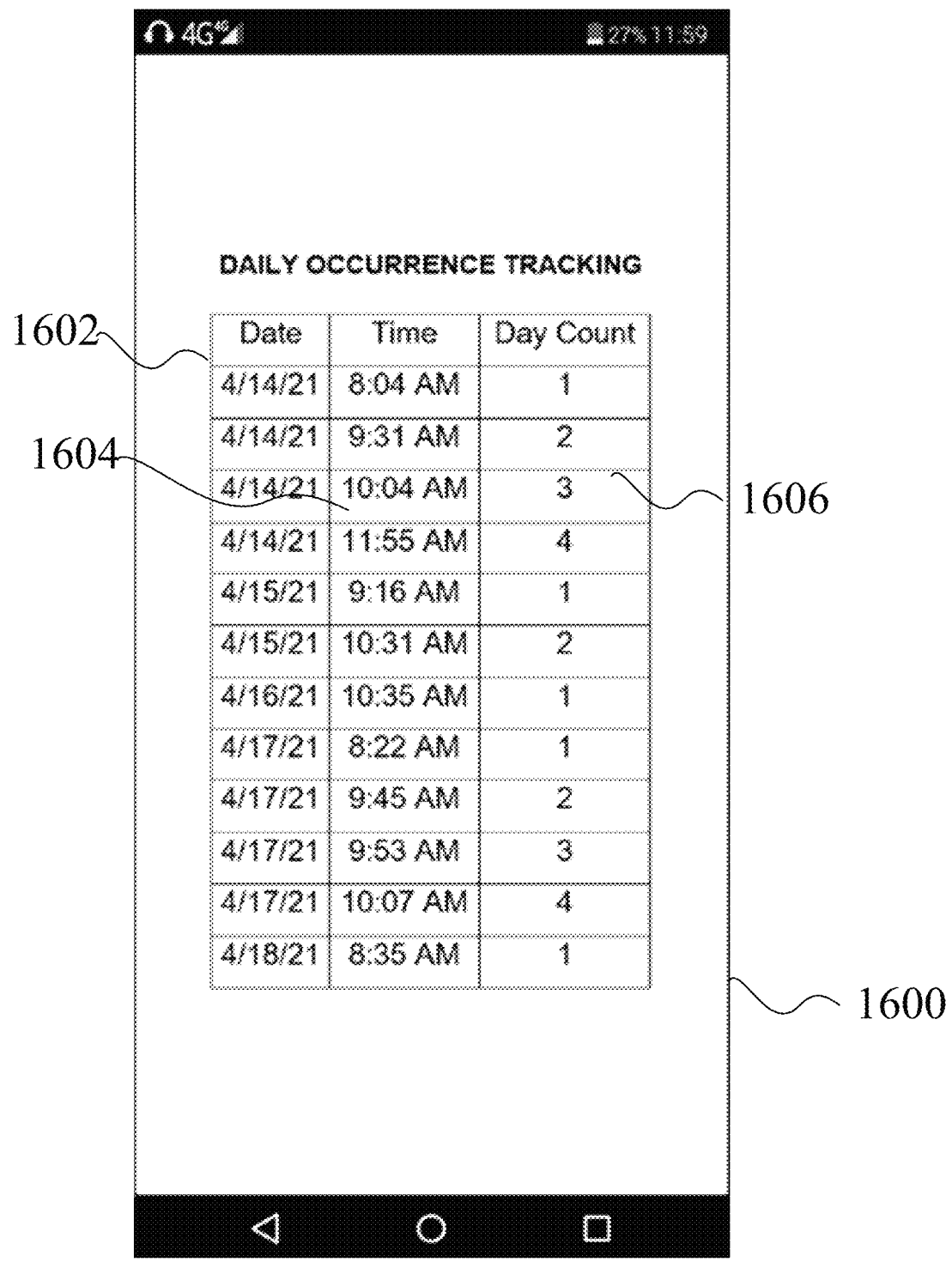
FIG. 16 is an example of a graphical user interface used to display data from the device, according to a particular embodiment.

FIG. 16 depicts an exemplary screenshot of an occurrence tracking screen 1600. The occurrence tracking screen 1600 is an exemplary screenshot from a mobile device application configured to wirelessly couple to the training system 100. The occurrence tracking screen 1600 displays to the user individual occurrences of facial touching in tabular form. The date is shown in a date column 1602, the time is shown in a time column 1604, and the occurrence count for that day is shown in a count column 1606. In some embodiments, the reset button 1022 may be used to rest the counter in the count column 1606. The occurrence tracking screen 1600 may be used by the user to analyze their behavior and determine any patterns or trends in their facial touching. This analysis may then be used to better train the user away from facial touching. In some embodiments, the occurrence tracking screen 1600 may be configured to display data in any configuration (e.g., table, bar chart, line chart, etc.). In some embodiments, the occurrence tracking screen 1600 may display additional data (e.g., trends, average distance, etc.).

Figure 17:
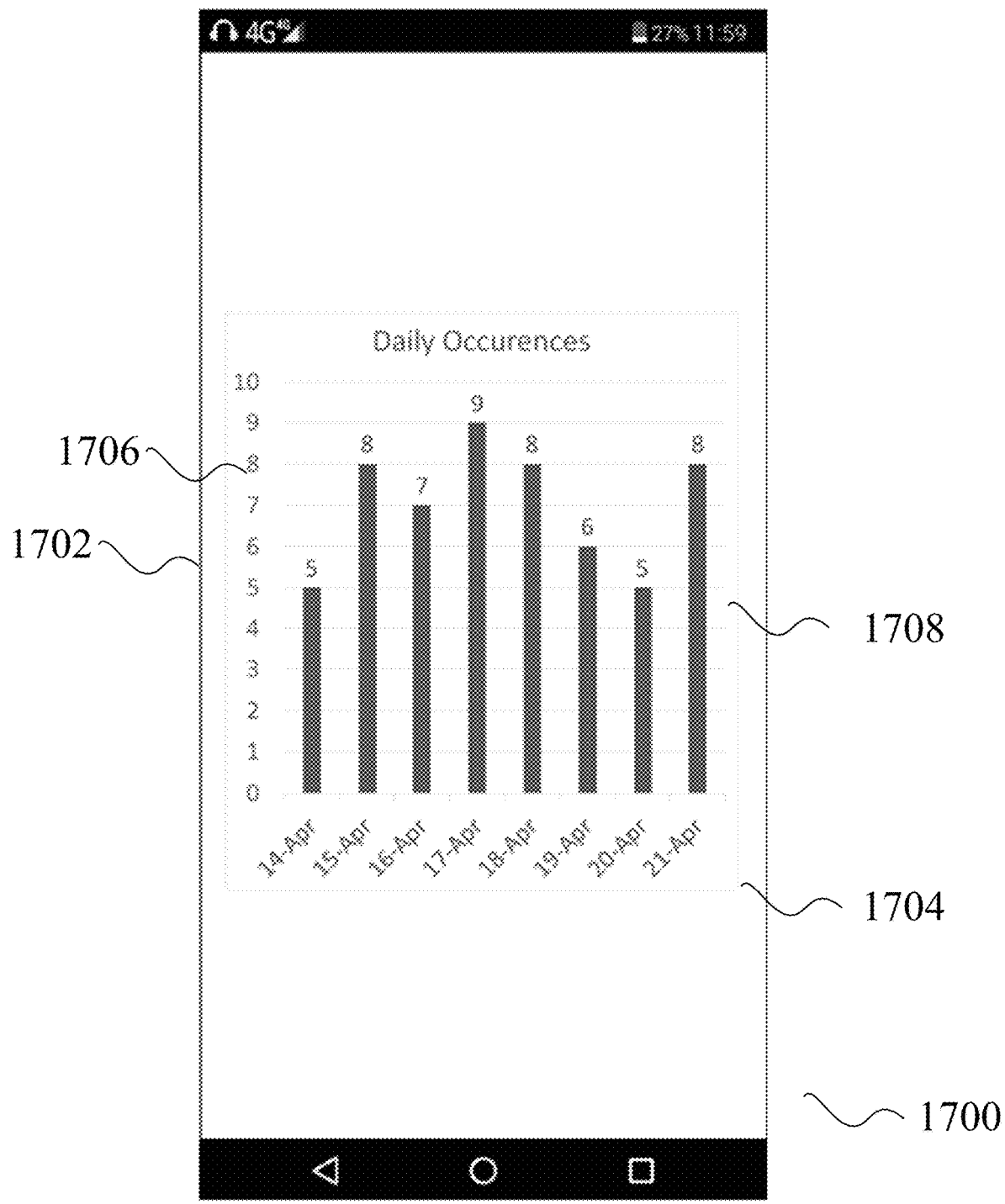
FIG. 17. is another example of a graphical user interface used to display data from the device, according to a particular embodiment.

FIG. 17 depicts an exemplary screenshot of an occurrence graphing screen 1700. The occurrence graphing screen 1700 is an exemplary screenshot from a mobile device application configured to wirelessly couple to the training system 100. The occurrence graphing screen 1700 displays to the user the total number of facial touching occurrences for each day. The occurrence graphing screen 1700 includes a bar chart 1702. On the horizontal-axis of the bar chart 1702 is each date 1704 and on the vertical-axis of the bar chart 1702 is the occurrence count 1706. For each date 1704 is an occurrence sum 1708 which corresponds to the total number of occurrences for the date 1704. The occurrence graphing screen 1700 may be used to determine trends and patterns in facial touching. This information may be used to better train the user away from facial touching, or may be used to determine if a user is finished with a training program if the occurrence sum 1708 is trending below a threshold. In some embodiments, the occurrence graphing screen 1700 may be configured to display data in any configuration (e.g., table, bar chart, line chart, etc.). In some embodiments, the occurrence graphing screen 1700 may display additional data (e.g., trends, average distance, etc.).

Figure 18:
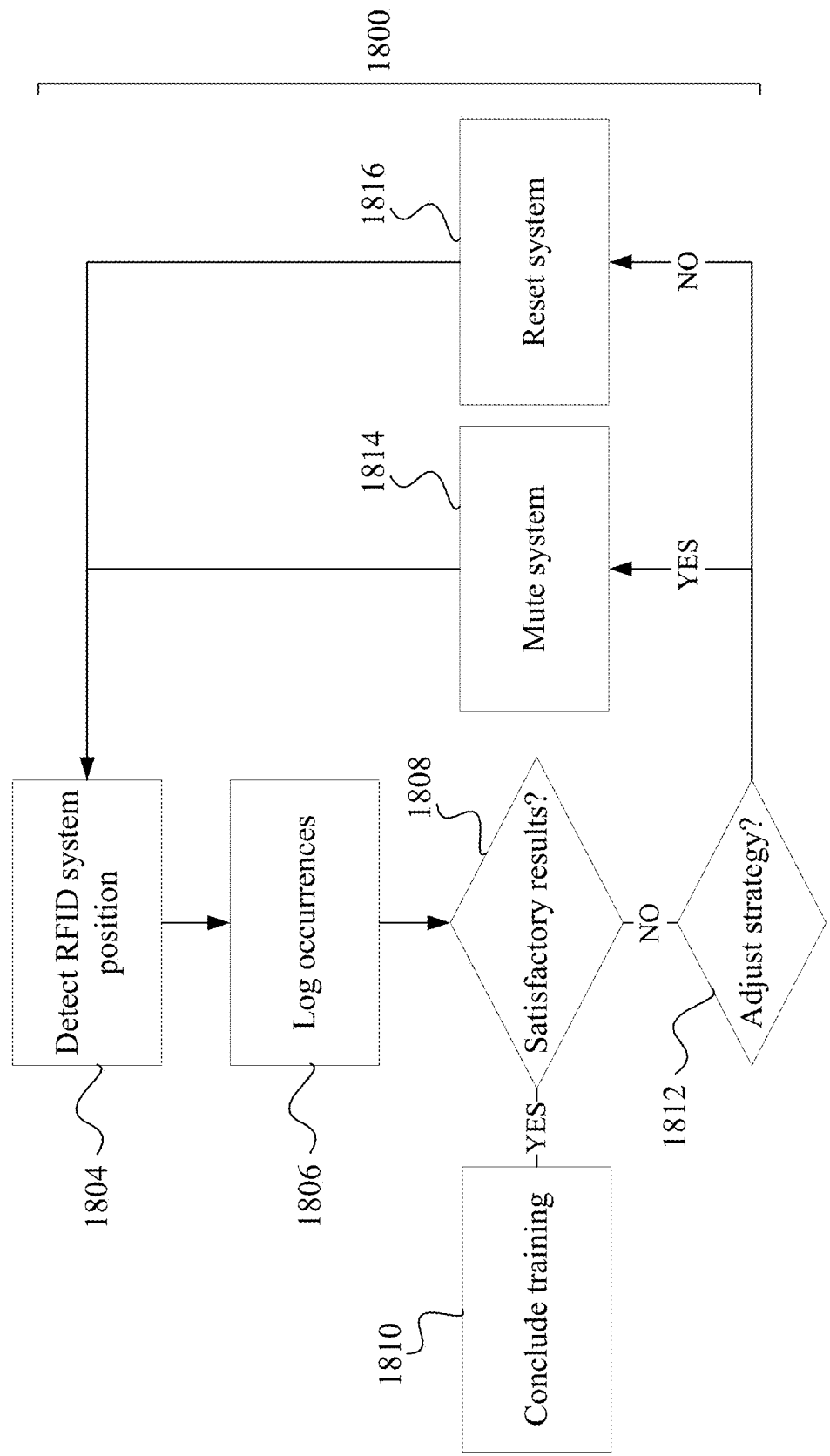
FIG. 18 illustrates a method for training using a RFID sleeve training system, according to a particular embodiment.

FIG. 18 depicts an exemplary flow diagram of a training method 1800 for training a user to avoid facial touching to prevent transmission of contaminants. For example, the training method 1800 can be applied when using the training system 100.

At 1804, the training system 100 detects the position of the RFID system (i.e., the RFID transponder 302 and the RFID module 1010). For example, initially the training system 100 may detect the position of the RFID system during calibration. During calibration a user may wear the training system 100 with the user wearing the first cuff 102 on the upper arm 104 and the second cuff 108 on the lower arm 110. In some embodiments, the user may alternatively wear the torso transponder 502. The training system 100 is then calibrated by, for example, altering the position of the first cuff 102 by translating and/or rotating the first cuff 102 relative to the upper arm 103. This alters the position of the RFID transponder 302 relative to the RFID module 1010 in the second cuff 108. In some embodiments, this calibration is repeated more than once such that the distance between the RFID transponder 302 and the RFID module 1010 is satisfactory for the user. For example, the user brings his or her hand up to his or her face. The user then determines if the distance between the user's hand and face when the training system 100 first alerts the user if sufficiently far/close enough for the user. If this distance is too close, then the user may decrease the distance between the RFID transponder 302 and the RFID module 1010. If this distance is too far, then the user may increase the distance between the RFID transponder 302 and the RFID module 1010.

After the calibration, the training system 100 detects the position of the RFID system during operation. For example, the training system 100 is active while the user continues standard activity (i.e., at home, at work, etc.). During this time, the training system 100 will detect each time the RFID transponder 302 is within range of the RFID module 1010.

At 1806, the training system 100 records within its internal memory each occurrence of the RFID transponder being within range of the RFID module 1010. For example, if the user brings his or her hand to his or her face 12 times during a work shift, then the training system 100 will record the time each occurrence occurred in the internal memory as well as a total count. The total count may be displayed on the screen 1014 of the training system 100. In some embodiments, the training system 100 may record other data (e.g., average distance between transponder and module, occurrence trends, etc.). In some embodiments, when an indicator (s) (e.g., audio, visual, vibrational, etc.) is available and the training system 100 is not muted, the user will be notified.

At 1808, a determination is made regarding the results of the training. For example, after a pre-determined amount of time (e.g., workday, shift, activity duration, etc.), the user may review the data recorded by the training system 100 on a paired (i.e., connected) device. If the results are satisfactory, such as a total number of occurrences being below a certain threshold, then continue to 1810. In some embodiments, the metrics for determining whether the results are satisfactory may be different (e.g., occurrence rate, etc.).

At 1810, the training method 1800 concludes. For example, the user may remove the training system 100 and reset functionality of the training system 100 so a new user may use the training system 100. In some embodiments, the training system 100 may generate a training concluding report.

If at 1808 the results are determined not to be satisfactory, a determination is made regarding a strategy adjustment at 1812. For example, a user may determine that the current training needs to continue as is (i.e., success metrics aren't sufficiently close to goals, etc.). In such cases, the user may press reset button 1022 at 1816 to reset the system and return the system to 1804.

In other embodiments, the user may want to adjust the strategy to emulate a "real-world" situation where the user is not wearing the training system 100. In such cases, the user may press the mute button 1020 at 1814 to mute the system and return to 1804. This mutes the indicators (e.g., audio, visual, vibrational, etc.) of the training system 100.

It should be noted that the term "exemplary" and variation thereof, as used herein to describe various embodiments, are intended to indicate that such embodiments are possible examples, representations, or illustrations of possible embodiments (and such terms are not intended to connote that such embodiments are necessarily extraordinary or superlative examples."

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

What is claimed is:

1. A sharable training system comprising:
    a first cuff configured to be worn on an upper arm of a user, the first cuff comprising:
        a first housing defining a first slot; and
        a radio-frequency identification (RFID) transponder sized to fit within the first slot;
    a second cuff configured to be worn on a lower arm of the user, the second cuff comprising a second housing defining a second slot; and
    an interchangeable computer system sized to fit within the second slot, the computer system comprising:
        an RFID reader;
        a processor; and
        instructions stored in a non-transitory machine-readable media that, when executed by the processor, cause the computer system to:
            determine whether the RFID transponder is within a first threshold distance of the RFID reader; and
            provide a notification to the user when the RFID transponder is within the first threshold distance, which indicates to the user that a distance between a hand of the user and a face of the user is less than a second threshold distance.

2. The system of claim 1, wherein the RFID transponder is configured to couple with a torso of the user.

3. The system of claim 1, wherein the second threshold distance is calibrated by adjusting a position of at least one of the first cuff and the second cuff.

4. The system of claim 1, wherein the instructions further cause the computer system to prevent notifications from being provided to the user upon activation of a mute function.

5. The system of claim 4, wherein the mute function is activated by a command input by the user.

6. The system of claim 1, wherein the first threshold distance is between 1 inch and 6 inches.

7. The system of claim 1, wherein the instructions further cause the computer system to record and display data to the user, the data associated with one or more of a distance between the RFID transponder and the RFID reader and a number of times the notification is provided to the user.

8. The system of claim 7 wherein the data corresponding to the number of times the notification is provided to the user is reset by a command input by the user.

9. The system of claim 1, wherein the notification is delivered to the user via one or more of a visual cue, an audio cue, and a haptic cue.

10. A method for training a user to avoid transmission comprising:
    positioning a first cuff on an upper arm of a user, the first cuff comprising a radio-frequency identification (RFID) transponder;
    positioning a second cuff on a lower arm of the user, the second cuff comprising an RFID reader;
    detecting when the RFID transponder and the RFID reader are within a first threshold distance of each other; and
    notifying the user when a distance between a hand of the user and a face of the user is less than a second threshold distance;
    wherein the second threshold distance is related to the first threshold distance.

11. The method of claim 10, further comprising coupling the RFID transponder with a torso of the user.

12. The method of claim 10, wherein notifying the user comprises one or more of a visual cue, an audio cue, and a haptic cue.

13. The method of claim 10, further comprising calibrating the second threshold distance by adjusting a position of at least one of the first cuff and the second cuff.

14. The method of claim 10, wherein the first threshold distance is between 1 inch and 6 inches.

15. The method of claim 10, further comprising preventing notifications from being provided to the user.

16. The method of claim 15, wherein the notifications are prevented based on a command input by the user.

17. The method of claim 10, further comprising recording data and displaying the data to the user, the data associated with one or more of a distance between the RFID transponder and the RFID reader and a number of times the notification is provided to the user.

18. The method of claim 17, wherein the data corresponding to the number of times the notification is provided to the user is reset based on a command input by the user.

19. An interchangeable computer system comprising a processor and instructions stored in a non-transitory machine-readable media that, when executed by the processor, cause the computer system to:
    determine whether a radio-frequency identification (RFID) transponder positioned on an upper arm of a user is within a first threshold distance of an RFID reader positioned on a lower arm of the user; and provide a notification to the user when the RFID transponder is within the first threshold distance, which indicates to the user that a distance between a hand of the user and a face of the user is less than a second threshold distance.

20. The system of claim 19, wherein the second threshold distance is calibrated by adjusting a position of at least one of the RFID transponder and the RFID reader.

* * * * *